United States Patent
Sung et al.

(10) Patent No.: US 9,451,509 B2
(45) Date of Patent: Sep. 20, 2016

(54) APPARATUS AND METHOD FOR PROVIDING HANDOVER INFORMATION WITHIN FEMTOCELL NETWORK AND TERMINAL USING THE SAME

(71) Applicant: Electronics and Telecommunications Research Institute, Daejeon (KR)

(72) Inventors: Nak-Woon Sung, Daejeon (KR); Sook-Jin Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 73 days.

(21) Appl. No.: 13/974,614

(22) Filed: Aug. 23, 2013

(65) Prior Publication Data
US 2014/0308952 A1 Oct. 16, 2014

(30) Foreign Application Priority Data

Apr. 16, 2013 (KR) .......... 10-2013-0041749

(51) Int. Cl.
*H04W 36/00* (2009.01)
*H04W 36/04* (2009.01)

(52) U.S. Cl.
CPC ......... *H04W 36/0083* (2013.01); *H04W 36/04* (2013.01)

(58) Field of Classification Search
CPC ........ G01S 19/42; G01S 19/44; G01S 19/55; H04W 36/03; H04W 36/18; H04W 80/04; H04W 36/30; H04W 84/12; H04W 76/007; H04W 64/00; H04W 4/02; H04W 48/04; H04W 36/0083; H04W 36/04

USPC ........... 455/434, 404.1, 432.1, 435.1, 455/456.1–456.5, 436–444; 370/331, 332, 370/333; 342/357.25, 357.27, 357.29, 342/357.38

See application file for complete search history.

(56) References Cited

U.S. PATENT DOCUMENTS

| 5,436,956 A | * | 7/1995 | Shiotsuki et al. | ............ 455/441 |
| 5,623,535 A | * | 4/1997 | Leung et al. | ................. 455/444 |

(Continued)

FOREIGN PATENT DOCUMENTS

| KR | 10-2009-0112337 A | 10/2009 |
| KR | 10-2010-0002044 A | 1/2010 |
| KR | 10-2010-0065062 A | 6/2010 |

OTHER PUBLICATIONS

Lee et al, Group Handover Scheme using Adjusted Delay for Multi-Access Networks, 2010, 978-1-4244-6404-3/10, p. 1.*

(Continued)

*Primary Examiner* — Wayne Cai
(74) *Attorney, Agent, or Firm* — Rabin & Berdo, P.C.

(57) ABSTRACT

Disclosed herein are an apparatus for providing handover information within a femtocell network, and a terminal using the same. The apparatus includes an expected stay time calculation unit, a handover target selection unit, and a handover information provision unit. The expected stay time calculation unit, for a terminal located within serving coverage range of a serving base station, calculates expected stay time, that is, a time for which the terminal will stay within a femtocell coverage range of each of the femtocell base stations. The handover target selection unit selects a handover target from among the femtocell base stations based on the calculated expected stay time. The handover information provision unit provides the terminal with handover information including the selected handover target.

9 Claims, 6 Drawing Sheets

(56) References Cited

U.S. PATENT DOCUMENTS

| | | | |
|---|---|---|---|
| 6,192,245 B1* | 2/2001 | Jones et al. | 455/437 |
| 8,812,050 B1* | 8/2014 | Bencheikh | 455/525 |
| 2007/0142050 A1* | 6/2007 | Handforth et al. | 455/436 |
| 2010/0167728 A1* | 7/2010 | Venkitaraman et al. | 455/434 |
| 2010/0173631 A1* | 7/2010 | Kim et al. | 455/436 |
| 2011/0105129 A1 | 5/2011 | Kim et al. | |
| 2011/0237252 A1 | 9/2011 | Kim et al. | |
| 2011/0306347 A1* | 12/2011 | Choi | H04W 36/04 455/438 |
| 2012/0129461 A1* | 5/2012 | Venkatraman | 455/67.11 |
| 2012/0135734 A1* | 5/2012 | Ma et al. | 455/436 |
| 2012/0165012 A1* | 6/2012 | Fischer et al. | 455/435.1 |
| 2013/0012212 A1* | 1/2013 | Murakami et al. | 455/439 |

OTHER PUBLICATIONS

Rasti et al, pareto-Efficient and Goal-Driven Power Control in Wireless Networks: A Game-Theoretic Approach with a Novel Pricing Scheme, Apr. 2009, IEEE, vol. 17 No. 2, p. 556, 566.*

Liao et al, Location Estimation and Tracking System for Mobile Devices in Project 802.16m SDD, Nov. 7, 2007, IEEE, C802.16m-7/202, p. 1, 3, 4.*

Lee et al, Group Handover Scheme using Adjusted Delay for Multi Access Networks, 2010, 978-1-42-64-3/10, p. 1.*

Yves Nevergelt, A tutorial history of least squares with applications to astronomy and geodesy, Sep. 2000, The Journal of Computational and Applied Mathematics vol. 121, Issues 1-2, example 8.*

* cited by examiner

APPARATUS AND METHOD FOR PROVIDING HANDOVER INFORMATION WITHIN FEMTOCELL NETWORK AND TERMINAL USING THE SAME

CROSS REFERENCE TO RELATED APPLICATION

This application claims the benefit of Korean Patent Application No. 10-2013-0041749, filed on Apr. 16, 2013, which is hereby incorporated by reference in its entirety into this application.

BACKGROUND OF THE INVENTION

1. Technical Field

The present invention relates generally to an apparatus and method for providing handover information within a femtocell network and a terminal using the same and, more particularly, to technology that is capable of providing handover information based on the time for which a terminal will stay within the coverage range of each of a plurality of femtocell base stations.

2. Description of the Related Art

Recently, the use of femtocell base stations has increased in wireless communication for terminals. A femtocell base station has a short coverage range, but is advantageous in that it can be installed close to a terminal and it offers a quality of service higher than that of a macro cell base station because it is installed close to the terminal.

In general, a femtocell base station has a short coverage range that is between 10 and 30 m. If a user moves while using his or her terminal, the user may move outside the coverage range due to moving around, resulting in the problem in which the terminal should perform frequent handover. In particular, if a user moves at high speed while using a terminal, frequent handover occurs as described above, with the result that the quality of service is deteriorated.

Korean Patent Application Publication No. 2009-0112337 relates to a method for handover to a plurality of femtocells, and discloses technology that enables a plurality of femtocells to share limited radio resources, thereby reducing the number of handover targets.

Furthermore, Korean Patent Application Publication No. 2010-0002044 relates to a femtocell search method for handover from a macro cell to a femtocell, and discloses technology in which a terminal connected to a macro cell can directly search for a femtocell, thereby minimizing the number of handover targets.

The conventional technologies for reducing the number of handover targets disclose only the technology for limiting radio resources or the technology based on the direct searching of a terminal, but do not disclose technology that selects a handover target based on the time for which a terminal will stay within the coverage range of each of a plurality of femto cell base stations, thereby overcoming the deterioration of the quality of service attributable to frequent handover.

Accordingly, in order to overcome the deterioration of the quality of service attributable to frequent handover, there is an urgent need for novel handover information provision technology that selects handover targets in descending order of the time for which a terminal will stay within the coverage range of each of a plurality of femtocell base stations or that excludes a femtocell base station from a handover target if a terminal moves at a speed equal to or higher than a predetermined reference speed within the coverage range of the femtocell base station.

SUMMARY OF THE INVENTION

Accordingly, the present invention has been made keeping in mind the above problems occurring in the prior art, and an object of the present invention is to provide handover information provision technology that selects a handover target based on the time for which a terminal will stay within the coverage range of each of a plurality of femtocell base stations, thereby overcoming a problem in that the time it takes to scan handover gain and to perform a handover is excessively long due to an excessive number of handover targets.

Another object of the present invention is to provide handover information provision technology that excludes a femtocell base station from a handover target if a terminal moves at a speed equal to or higher than a predetermined reference speed within the coverage range of each of a plurality of femtocell base stations, thereby overcoming the deterioration of the quality of service attributable to frequent handover.

Yet another object of the present invention is to provide handover information provision technology that selects a handover target in descending order of the time for which a terminal will stay within the coverage range of each of a plurality of femtocell base stations, thereby overcoming the deterioration of the quality of service attributable to frequent handover.

In accordance with an aspect of the present invention, there is provided an apparatus for providing handover information within a femtocell network, including an expected stay time calculation unit configured to, for a terminal located within a serving coverage range of a serving base station, calculate expected stay time, that is, the time for which the terminal will stay within a femtocell coverage range of each of a plurality of femtocell base stations; a handover target selection unit configured to select a handover target from among the femtocell base stations based on the calculated expected stay time; and a handover information provision unit configured to provide the terminal with handover information including the selected handover target.

The handover target selection unit may not select the femtocell base station as the handover target if the speed of movement of the terminal is equal to or higher than a predetermined reference speed and the femtocell coverage range is shorter than a predetermined reference coverage range.

The handover target selection unit may not select the femtocell base station as the handover target if the expected stay time is shorter than a predetermined reference time.

The handover target selection unit may selects a number of femtocell base stations equal to the predetermined number of reference base stations as the handover target in descending order of expected stay time.

The expected stay time calculation unit may calculate the expected stay time based on one or more of the location and femtocell coverage range of the femtocell base station, the location of the terminal, and the speed and direction of movement of the terminal.

The expected stay time calculation unit may include a femtocell information calculation unit configured to calculate the location of the femtocell base station based on three or more macro cell base stations near the femtocell base station using a least square method.

The expected stay time calculation unit may include a terminal information calculation unit configured to calculate a location of the terminal based on three or more macro cell base stations near the terminal using a least square method and to calculate the speed and direction of movement of the terminal using a Kalman filter.

In accordance with another aspect of the present invention, there is provided a terminal using handover information within a femtocell network, including a handover information acquisition unit configured to acquire handover information, including a handover target selected based on expected stay time, that is, the time for which the terminal will stay within a femtocell coverage range of each of a plurality of femtocell base stations, from a serving base station; a transmission strength determination unit configured to determine optimum transmission strength based on one or more of femtocell throughput and handover access blocking time of a handover target; and a handover execution unit configured to determine the serving base station or the handover target as an optimum base station corresponding to the optimum transmission strength and to perform handover to the handover target if the handover target is the optimum base station.

The transmission strength determination unit may determine the optimum transmission strength that forms Pareto optimality for other terminals according to a non-cooperation game method.

The handover execution unit may not perform the handover if the serving base station is the optimum base station.

In accordance with still another aspect of the present invention, there is provided a method of providing handover information within a femtocell network, including calculating expected stay time, that is, the time for which a terminal located within serving coverage range of a serving base station will stay within a femtocell coverage range of each of a plurality of femtocell base stations; selecting a handover target from among the femtocell base stations based on the calculated expected stay time; and providing the terminal with handover information including the selected handover target.

Selecting the handover target may include not selecting the femtocell base station as the handover target if speed of movement of the terminal is equal to or higher than a predetermined reference speed and the femtocell coverage range is shorter than a predetermined reference coverage range.

Selecting the handover target may include not selecting the femtocell base station as the handover target if the expected stay time is shorter than a predetermined reference time.

Selecting the handover target may include selecting a number of femtocell base stations equal to the predetermined number of reference base stations as the handover target in descending order of expected stay time.

Calculating the expected stay time may include calculating the expected stay time based on one or more of the location and femtocell coverage range of the femtocell base station, the location of the terminal, and the speed and direction of movement of the terminal.

Calculating the expected stay time may include calculating the location of the femtocell base station based on three or more macro cell base stations near the femtocell base station using a least square method.

Calculating the expected stay time may include calculating the location of the terminal based on three or more macro cell base stations near the terminal using a least square method; and calculating the speed and direction of movement of the terminal using a Kalman filter.

Providing the handover information within the femtocell network may include determining optimum transmission strength based on one or more of the femtocell throughput and handover access blocking time of the handover target; and determining the serving base station or the handover target as an optimum base station corresponding to the optimum transmission strength, and performing handover to the handover target if the handover target is the optimum base station.

Determining the optimum transmission strength may include determining the optimum transmission strength that forms Pareto optimality for other terminals according to a non-cooperation game method.

Determining the optimum transmission strength may include not performing the handover if the serving base station is the optimum base station.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings. Repeated descriptions and descriptions of known functions and configurations which have been deemed to make the gist of the present invention unnecessarily vague will be omitted below. The embodiments of the present invention are intended to fully describe the present invention to a person having ordinary knowledge in the art. Accordingly, the shapes, sizes, etc. of elements in the drawings may be exaggerated to make the description clear.

Figure 1:
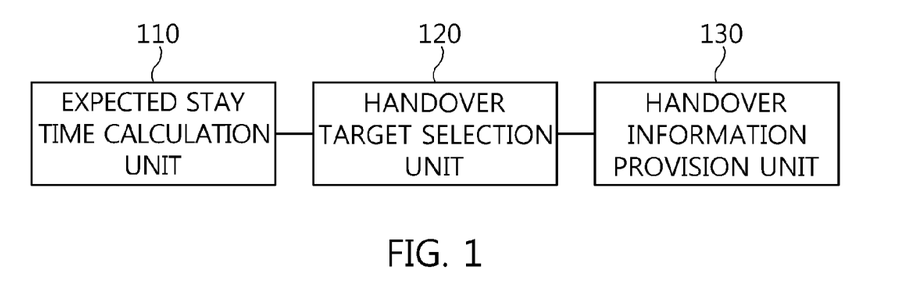
FIG. 1 is a block diagram of an apparatus for providing handover information within a femtocell network according to an embodiment of the present invention.

FIG. 1 is a block diagram of an apparatus for providing handover information within a femtocell network according to an embodiment of the present invention.

Referring to FIG. 1, the apparatus for providing handover information within a femtocell network according to this embodiment of the present invention includes an expected stay time calculation unit 110, a handover target selection unit 120, and a handover information provision unit 130.

The expected stay time calculation unit 110 calculates expected stay time, that is, the time for a terminal 200 (see FIG. 2) will stay within the femtocell coverage range of each of a plurality of femtocell base stations.

The expected stay time calculation unit 110 may include a femtocell information calculation unit that calculates the location of the femtocell base station based on three or more macro cell base stations 400 (see FIGS. 4 and 5) near the femtocell base station using a least square method.

The femtocell base station may be located within the macro cell coverage range 405 (see FIGS. 4 and 5) of the macro cell base stations 400.

Figure 4:
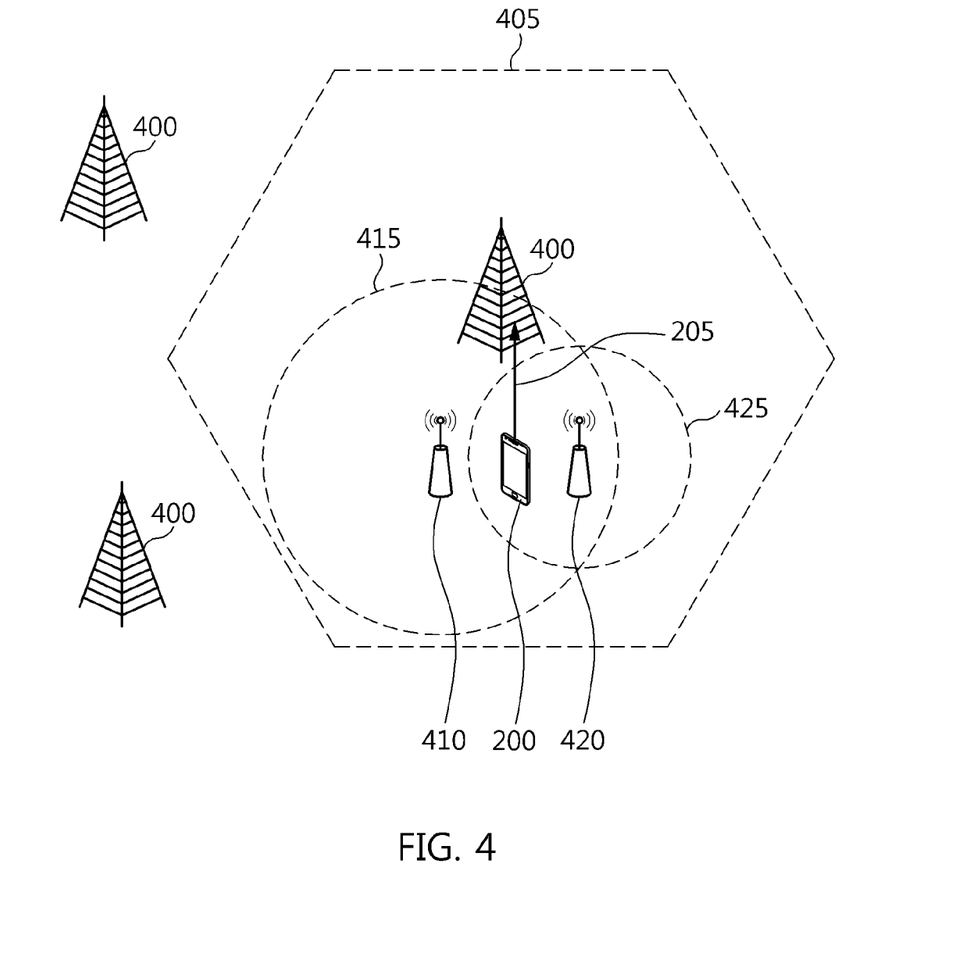
FIG. 4 is a diagram showing an example of selecting a handover target using a handover target selection unit.
Figure 5:
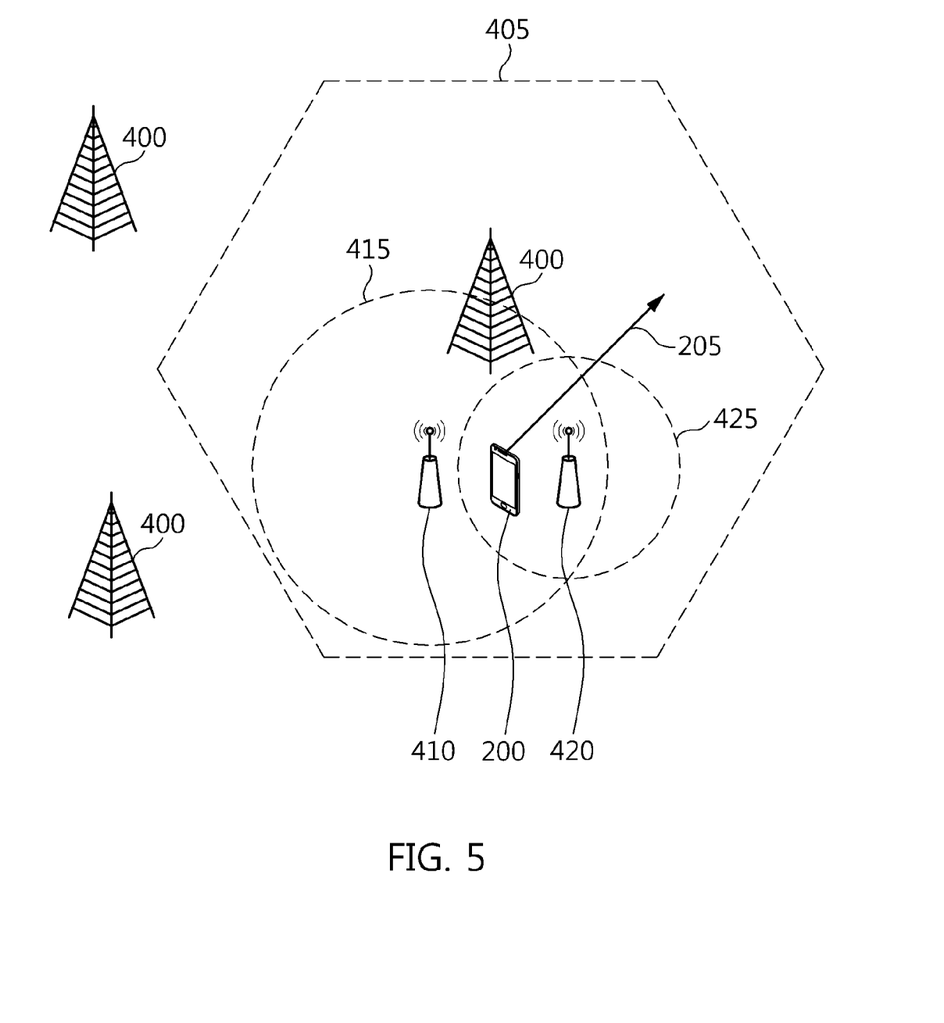
FIG. 5 is a diagram showing another example of selecting a handover target using the handover target selection unit.

The femtocell information calculation unit may calculate the distance between each of the macro cell base stations 400 and the femtocell base station using the following Equation 1:

$$\hat{d}_{f,m} = 10^{\frac{k_f - \Psi_{f,m} + \aleph}{\beta}} \quad (1)$$

In Equation 1, $\hat{d}_{f,m}$ is the distance between each of the macro cell base stations 400 and the femtocell base station, $k_f$ is the radio environment constant of the femtocell base station, $\beta$ is an operation area constant, $\Psi_{f,m}$ is a Received Signal Strength Indication (RSSI) measured between the macro cell base station 400 and the femtocell base station, and $\aleph$ is a white Gaussian noise parameter.

The femtocell information calculation unit may calculate the distance between the first of the macro cell base stations 400 and the femtocell base station as a first distance, may calculate a second distance and a third distance in the same manner, and may calculate the location of the femtocell base station based on the first, second and third distances using a least square method.

Figure 6:
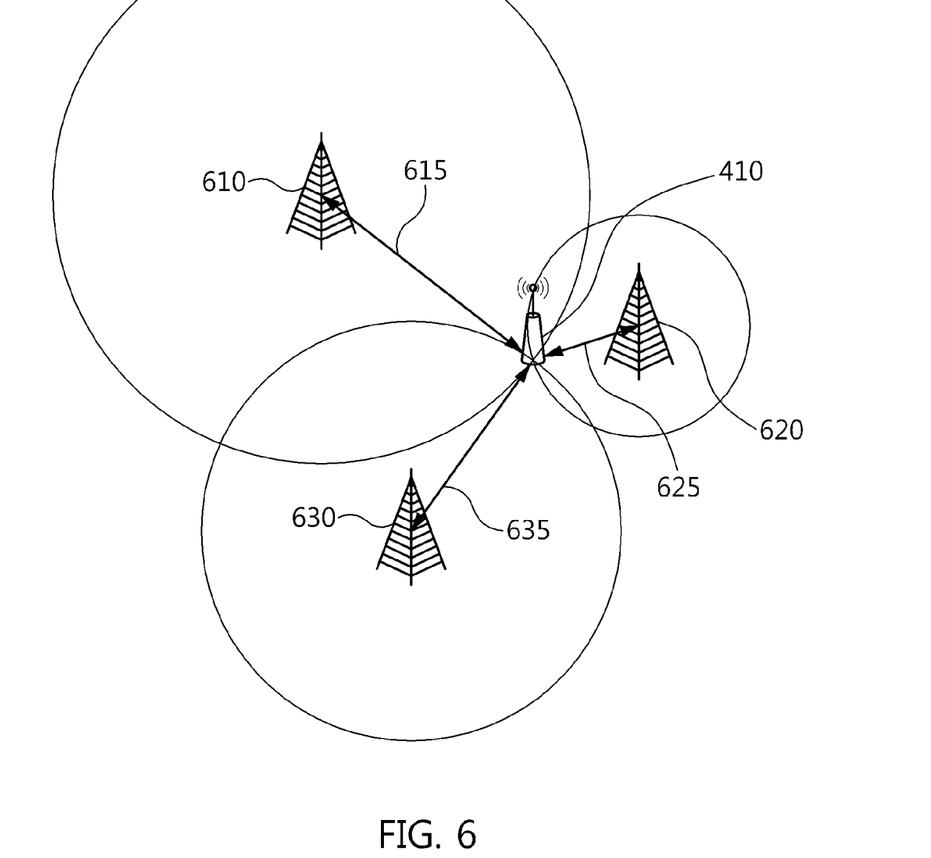
FIG. 6 is a diagram showing an example of calculating the location of a femtocell base station using an expected stay time calculation unit.

For example, referring to FIG. 6, the femtocell information calculation unit may calculate the distance between a first macro cell base station 610 and a first femtocell base station 410 as a first macro-femto distance 615, the distance between a second macro cell base station 620 and the first femtocell base station 410 as a second macro-femto distance 625, and the distance between a third macro cell base station 630 and the first femtocell base station 410 as a third macro-femto distance 635, and may calculate the location of the first femtocell base station 410 based on the first macro-femto distance 615, the second macro-femto distance 625, the third macro-femto distance 635 using a least square method.

The expected stay time calculation unit 110 may further include a terminal information calculation unit that calculates the location of the terminal 200 based on three or more macro cell base stations 400 near the terminal 200 using a least square method and also calculates the speed and direction 205 (see FIGS. 4 and 5) of movement of the terminal 200 using a Kalman filter.

The terminal 200 may be located within the macro cell coverage range 405 of the macro cell base stations 400.

The expected stay time calculation unit 110 may calculate expected stay time based on one or more of the location and femtocell coverage range of the femtocell base station, the location of the terminal 200, and the speed and direction of movement of the terminal 200.

The expected stay time calculation unit 110 may calculate the expected stay time using the following Equation 2:

$$T = \frac{d_0 \sin\left(\theta + \sin^{-1}\left(\frac{d}{d_0}\sin\theta\right)\right)}{v\sin\theta} \quad (2)$$

In Equation 2, T is the expected stay time, $d_0$ is the femtocell coverage range of the femtocell base stations, d is the distance between the femtocell base station and the terminal 200, $\theta$ is the angle between the direction 205 of movement of the terminal 200 and the direction of a segment that connects the femtocell base station with the terminal 200, and v is the speed of movement of the terminal 200.

The handover target selection unit 120 selects a handover target from among the femtocell base stations based on the calculated expected stay time.

The handover target selection unit 120 may not select the femtocell base station as the handover target if the speed of movement of the terminal 200 is equal to or higher than a predetermined reference speed and the femtocell coverage range of the femtocell base station is smaller than a predetermined reference coverage range.

The handover target selection unit 120 may not select the femtocell base station as the handover target if the expected stay time is shorter than a predetermined reference time.

The handover target selection unit 120 may select a number of femtocell base stations equal to the predetermined number of reference base stations as the handover target in descending order of expected stay time.

The handover information provision unit 130 provides the terminal 200 with handover information including the selected handover target.

Figure 2:
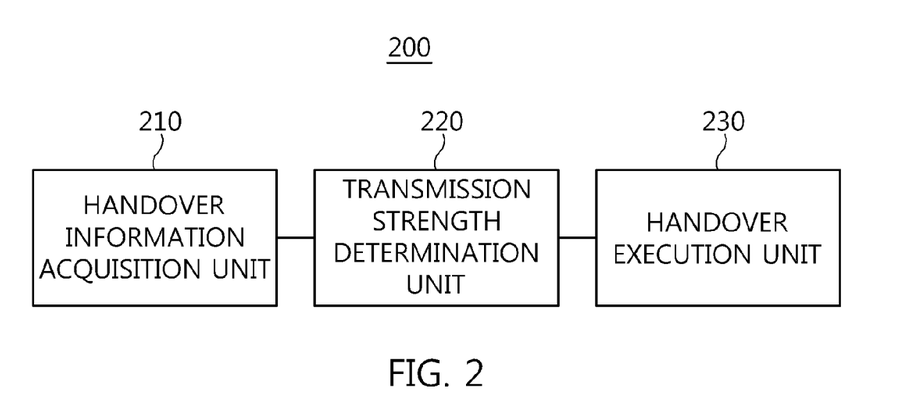
FIG. 2 is a block diagram of a terminal using handover information within a femtocell network according to an embodiment of the present invention.

FIG. 2 is a block diagram of the terminal 200 using handover information within a femtocell network according to an embodiment of the present invention.

Referring to FIG. 2, the terminal 200 using handover information within a femtocell network according to this embodiment of the present invention includes a handover information acquisition unit 210, a transmission strength determination unit 220, and a handover execution unit 230.

The handover information acquisition unit 210 acquires handover information, including a handover target selected based on the expected stay time, from a serving base station.

The expected stay time is the time for which the terminal 200 will stay within the femtocell coverage range of each of the femtocell base stations, and may be calculated by the serving base station.

The expected stay time may be calculated using the above-described Equation 2.

The transmission strength determination unit 220 may determine optimum transmission strength based on one or more of the femtocell throughput and handover access blocking time of the handover target.

The transmission strength determination unit 220 may determine optimum transmission strength that forms Pareto optimality for other terminals 200 according to a non-cooperation game method.

The transmission strength determination unit 220 may determine the optimum transmission strength using the following Equation 3:

$$p_i(b_j) = \operatorname*{argmax}_{p_i} \gamma_i(p_i, p_i^{-*}, b_j, b_j^{-*})\left(1 - \frac{\varepsilon}{T_{i,j}}\right) - \sum_{j \in N_i} (\varpi_{i,j} p_i)^2 \quad (3)$$

In Equation 3, $p_i$ is the transmission strength of the terminal 200, $p_i^*$ is the optimum transmission strength of the other terminals 200, $\gamma_i$ is the femtocell throughput, $b_j$ is the handover target, $b_j^*$ is an optimum base station corresponding to the other terminals 200, $\epsilon$ is the handover access blocking time, and $\overline{\omega}_{i,j}$ is a parameter that is 1 when the terminal 200 is associated with the handover target and 0 when the terminal 200 is not associated with the handover target.

The femtocell throughput may be calculated using the following Equation 4:

$$\gamma_i(p_i, p_i^-, b_j, b_j^-) = \frac{p_i g_{i,j}}{\sum_{k \neq i, k \in N} p_k g_{k,j} + \aleph^2} \quad (4)$$

In Equation 4, $g_{i,j}$ is the propagation loss between the handover target and the terminal 200, $p_k$ is the transmission strength of other terminals 200, and $g_{k,j}$ is the propagation loss between the other terminals 200 and a handover target corresponding to the other terminals 200.

The handover execution unit 230 determines the serving base station or the handover target as an optimum base station corresponding to the optimum transmission strength, and performs handover to the handover target if the handover target is the optimum base station.

The handover execution unit 230 may determine the optimum base station corresponding to the optimum transmission strength using the following Equation 5:

$$\max_{j \in N_i} \gamma_i(p_i^*(b_j), p_j^{-*}, b_j, b_j^{-*})\left(1 - \frac{\varepsilon}{T_{i,j}}\right) - \sum_{j \in N_i} (\varpi_{i,j} p_i^*)^2 \quad (5)$$

The result value of Equation 5 is a handover gain value of the terminal 200, and $p_i^*(b_i)$ is the optimum transmission strength.

The handover execution unit 230 may determine the handover target, having a maximum handover gain value, as the optimum base station.

The handover execution unit 230 may not perform the handover if the serving base station is the optimum base station.

Figure 3:
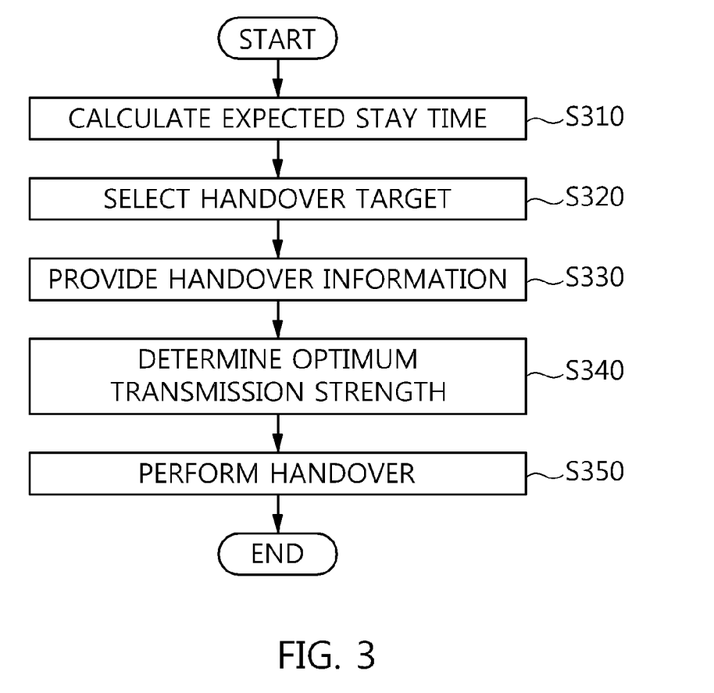
FIG. 3 is a flowchart illustrating a method of providing handover information within a femtocell network according to an embodiment of the present invention.

FIG. 3 is a flowchart illustrating a method of providing handover information within a femtocell network according to an embodiment of the present invention.

Referring to FIG. 3, in the method of providing handover information within a femtocell network according to this embodiment of the present invention, first, expected stay time, that is, the time for which the terminal 200 will stay within the femtocell coverage range of each of a plurality of femtocell base stations, is calculated at step S310.

At step S310, the location of the femtocell base station is calculated based on three or more macro cell base stations 400 near the femtocell base station using the least square method.

At step S310, the distances between the macro cell base stations 400 and the femtocell base station may be calculated using Equation 1.

At step S310, the distance between the first of the macro cell base stations 400 and the femtocell base station may be calculated as a first distance, a second distance and a third distance may be calculated in the same manner, and the location of the femtocell base station may be calculated based on the first, second and third distances using a least square method.

At step S310, the location of the terminal 200 may be calculated based on three or more macro cell base stations 400 near the terminal 200 using the least square method, and the speed and direction 205 of movement of the terminal 200 may be calculated using a Kalman filter.

At step S310, the expected stay time may be calculated based on one or more of the location and femtocell coverage range of the femtocell base station, the location of the terminal 200, and the speed and direction 205 of movement of the terminal 200.

At step S310, the expected stay time may be calculated using Equation 2.

Thereafter, a handover target is selected from among the femtocell base stations based on the calculated expected stay time at step S320.

At step S320, if the speed of movement of the terminal 200 is equal to or higher than a predetermined reference speed and the femtocell coverage range is shorter than a predetermined reference coverage range, the femtocell base station may not be selected as the handover target.

At step S320, if the expected stay time is shorter than a predetermined reference time, the femtocell base station may not be selected as the handover target.

At step S320, a number of femtocell base stations equal to the predetermined number of reference base stations may be selected as the handover target in descending order of expected stay time.

Thereafter, handover information including the selected handover target is provided to the terminal 200 at step S330.

Thereafter, optimum transmission strength is determined based on one or more of the femtocell throughput and handover access blocking time of the handover target at step S340.

At step S340, the optimum transmission strength that forms Pareto optimality for other terminals 200 according to a non-cooperation game method may be determined.

At step S340, the optimum transmission strength may be determined using Equation 3.

The femtocell throughput may be calculated using Equation 4.

Thereafter, a serving base station or the handover target is determined as an optimum base station corresponding to the optimum transmission strength. If the handover target is the optimum base station, a handover to the handover target is performed at step S350.

At step S350, the optimum base station corresponding to the optimum transmission strength may be determined using Equation 5.

At step S350, the handover target having the maximum result value of Equation 5 may be determined as the optimum base station.

At step S350, if the serving base station is the optimum base station, the handover may not be performed.

FIG. 4 is a diagram showing an example of selecting a handover target.

Referring to FIG. 4, the handover target selection unit 120 selects a handover target from femtocell base stations based on calculated expected stay time.

The handover target selection unit 120 may select a number of femtocell base stations equal to the predetermined number of reference base stations as a handover target in descending order of expected stay time.

For example, if the terminal 200 is located within the first femtocell coverage range 415 of the first femtocell base station 410 having an expected stay time of 3 minutes and the second femtocell coverage range 425 of the second femtocell base station 420 having an expected stay time of 1 minute and the number of reference base stations is 1, the handover target selection unit 120 may select the first femtocell base station 410 as the handover target.

The handover target selection unit 120 may not select the femtocell base station as the handover target if the expected stay time is shorter than a predetermined reference time.

For example, if the terminal 200 is located within the second femtocell coverage range 425 of the second femtocell base station 420 having an expected stay time of 1 minute and the predetermined reference time is 2 minutes, the handover target selection unit 120 may not select the second femtocell base station 420 as the handover target.

FIG. 5 is a diagram showing another example of selecting a handover target using the handover target selection unit 120.

Referring to FIG. 5, the handover target selection unit 120 selects a handover target from among femtocell base stations based on calculated expected stay time.

The handover target selection unit 120 may not select a specific femtocell base station as a handover target if the speed of movement of the terminal 200 is equal to or higher than a predetermined reference speed and the femtocell coverage range of the specific femtocell base station is smaller than a predetermined coverage range.

For example, if the terminal 200 is located within the first femtocell coverage range 415 of the first femtocell base station 410, the speed of movement of the terminal 200 is 3 m/s, the first femtocell coverage range 415 is 30 m, the reference speed is 2 m/s, and the reference coverage range is 100 m, the handover target selection unit 120 may not select the first femtocell base station 410 as a handover target.

FIG. 6 is a diagram showing an example of calculating the location of a femtocell base station using the expected stay time calculation unit 110.

Referring to FIG. 6, the femtocell information calculation unit of the expected stay time calculation unit 110 may calculate the location of the femtocell base station based on three or more macro cell base stations 400 near the femtocell base station using a least square method.

The femtocell information calculation unit may calculate the distances between the macro cell base stations 400 and the femtocell base station using Equation 1.

The femtocell information calculation unit may calculate the distance between the first of the macro cell base stations 400 and the femtocell base station as a first distance, may calculate a second distance and a third distance, and may calculate the location of the femtocell base station based on the first, second and third distances using a least square method.

Figure 7:
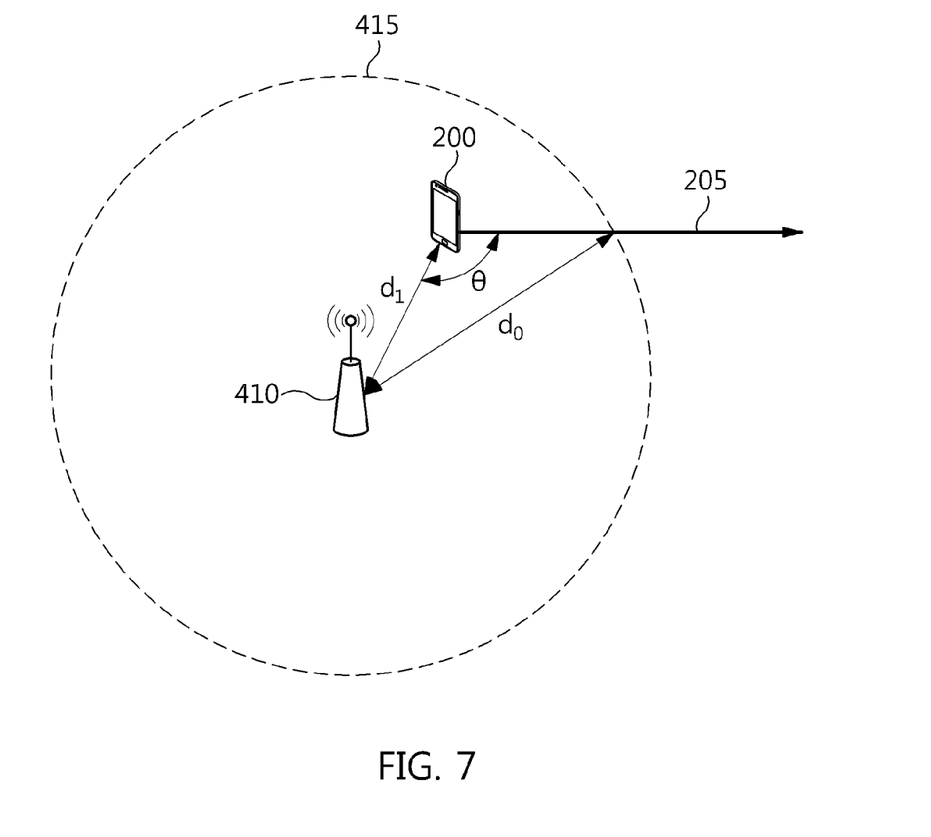
FIG. 7 is a diagram showing an example of calculating expected stay time according to the present invention.

FIG. 7 is a diagram showing an example of calculating expected stay time according to the present invention.

Referring to FIG. 7, the expected stay time calculation unit 110 may calculate expected stay time based on one or more of the location of the femtocell base station, the femtocell coverage range of the femtocell base station, the location of the terminal 200, and the speed and direction 205 of movement of the terminal 200.

The expected stay time calculation unit 110 may calculate the expected stay time using Equation 2.

As described above, the present invention provides handover information provision technology that selects a handover target based on the time for which a terminal will stay within the coverage range of each of a plurality of femtocell base stations, thereby overcoming a problem in that the time it takes to scan handover gain and to perform a handover is excessively long due to an excessive number of handover targets.

Furthermore, the present invention provides handover information provision technology that excludes a femtocell base station from a handover target if a terminal moves at a speed equal to or higher than a predetermined reference speed within the coverage range of each of a plurality of femtocell base stations, thereby overcoming the deterioration of the quality of service attributable to frequent handover.

Moreover, the present invention provides handover information provision technology that selects a handover target in descending order of the time for which a terminal will stay within the coverage range of each of a plurality of femtocell base stations, thereby overcoming the deterioration of the quality of service attributable to frequent handover.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for providing handover information within a femtocell network, comprising:
    an expected stay time calculation unit configured to, for a terminal located within a serving coverage range of a serving base station, calculate expected stay time, that is, a time for which the terminal will stay within a femtocell coverage range of each of a plurality of femtocell base stations, based at least partly on the femtocell coverage range of each of the plurality of femtocell base stations, a distance between the terminal and each of the plurality of femtocell base stations, an angle between a direction of movement of the terminal and a segment that connects the terminal with each of the plurality of femtocell base stations, and a speed of movement of the terminal;
    a handover target selection unit configured to select a handover target from among the femtocell base stations based on the calculated expected stay time; and
    a handover information provision unit configured to provide the terminal with handover information including the selected handover target;
    wherein the expected stay time calculation unit comprises a femtocell information calculation unit configured to calculate a location of the femtocell base station based on three or more macro cell base stations near the femtocell base station using a least square method.

2. The apparatus of claim 1, wherein the handover target selection unit does not select the femtocell base station as the handover target if speed of movement of the terminal is equal to or higher than a predetermined reference speed and the femtocell coverage range is shorter than a predetermined reference coverage range.

3. The apparatus of claim 2, wherein the handover target selection unit does not select the femtocell base station as the handover target if the expected stay time is shorter than a predetermined reference time.

4. The apparatus of claim 3, wherein the handover target selection unit selects a number of femtocell base stations equal to a predetermined number of reference base stations as the handover target in descending order of expected stay time.

5. The apparatus of claim 4, wherein the expected stay time calculation unit calculates the expected stay time based on one or more of a location and femtocell coverage range of the femtocell base station, a location of the terminal, and the speed of movement of the terminal, and a direction of movement of the terminal.

6. The apparatus of claim 4, wherein the expected stay time calculation unit comprises a terminal information calculation unit configured to calculate a location of the terminal based on three or more macro cell base stations near the terminal using a least square method and to calculate the speed and direction of movement of the terminal using a Kalman filter.

7. A terminal using handover information within a femtocell network, comprising:
- a handover information acquisition unit configured to acquire handover information, including a handover target selected based on expected stay time, that is, a time for which the terminal will stay within a femtocell coverage range of each of a plurality of femtocell base stations, from a serving base station;
- a transmission strength determination unit configured to determine optimum transmission strength based on one or more of femtocell throughput and handover access blocking time of a handover target; and
- a handover execution unit configured to determine the serving base station or the handover target as an optimum base station corresponding to the optimum transmission strength and to perform handover to the handover target if the handover target is the optimum base station;

wherein the transmission strength determination unit determines the optimum transmission strength in terms of a calculation including a handover access blocking time; and wherein the handover execution unit determines the serving base station or the handover target as the optimum base station based at least partly on a maximum of the one or more of femtocell throughput in terms of parameters including a transmission strength of at least one other terminal, a propagation loss between the terminal and the handover target, and a propagation loss between the at least one other terminal and the handover target.

8. The terminal of claim 7, wherein the transmission strength determination unit determines the optimum transmission strength that forms Pareto optimality for other terminals according to a non-cooperation game method.

9. The terminal of claim 7, wherein the handover execution unit does not perform the handover if the serving base station is the optimum base station.

* * * * *